(12) United States Patent
Gaglani et al.

(10) Patent No.: US 7,615,585 B2
(45) Date of Patent: Nov. 10, 2009

(54) DEGASSING COMPOSITIONS FOR CURABLE COATINGS

(75) Inventors: Kamlesh Gaglani, Belle Mead, NJ (US); Meihua Yang, Hillsborough, NJ (US); Gordon Thakkar, Edison, NJ (US)

(73) Assignee: Troy Corporation, Florham Park, NJ (US)

( * ) Notice: Subject to any disclaimer, the term of this patent is extended or adjusted under 35 U.S.C. 154(b) by 328 days.

(21) Appl. No.: 11/788,679

(22) Filed: Apr. 19, 2007

(65) Prior Publication Data
US 2009/0023847 A1 Jan. 22, 2009

(51) Int. Cl.
C08K 5/1565 (2006.01)
(52) U.S. Cl. .................................. 524/108
(58) Field of Classification Search .............. 524/108
See application file for complete search history.

(56) References Cited

U.S. PATENT DOCUMENTS

| | | | |
|---|---|---|---|
| 3,872,040 | A | 3/1975 | Mollohan et al. |
| 4,032,536 | A | 6/1977 | Raeymaekers et al. |
| 5,153,252 | A | 10/1992 | Skora |
| 5,324,372 | A | 6/1994 | Chiotis |
| 5,342,893 | A | 8/1994 | Wilkinson et al. |
| 6,015,864 | A | 1/2000 | Koenraadt et al. |
| 6,100,349 | A | 8/2000 | Koenraadt et al. |
| 6,184,279 | B1 | 2/2001 | Anderson et al. |
| 6,342,551 | B1 | 1/2002 | Jolley et al. |
| 6,534,235 | B1 | 3/2003 | Hanabata et al. |
| 2004/0082679 | A1 * | 4/2004 | Jahromi ................ 522/71 |
| 2006/0292374 | A1 | 12/2006 | Chasser et al. |
| 2007/0031676 | A1 | 2/2007 | Itou et al. |

FOREIGN PATENT DOCUMENTS

| | | |
|---|---|---|
| DE | 24 56 961.7 | 12/1974 |
| EP | 0 471 409 A1 | 8/1991 |
| GB | 1425498 | * 2/1976 |
| WO | WO 2005/051552 | * 6/2005 |
| WO | PCT/US 2008/004845 | 9/2008 |

OTHER PUBLICATIONS

Summerbell et al. Rearrangements of alpha-Halogenated Ethers. Journal of the American Chemical Society (1959), 81, 633-9.*

(Continued)

*Primary Examiner*—Marc S. Zimmer
*Assistant Examiner*—John Uselding
(74) *Attorney, Agent, or Firm*—Robert A. Yesukevich (57) ABSTRACT

Non-yellowing degassing compositions which enhance degassing in powder coatings and other film-forming curable coatings are disclosed. The non-yellowing compositions contain degassing agents including a plurality of unfused aromatic rings and at least one functional group selected from ketals, carbamates, carbonates and carboxylic acid esters. The degassing agents resist decomposition and discoloration, and are relatively stable at resin curing conditions and. The degassing agents may be synergistically combined with other materials, such as fatty acid amide-containing waxes, to produce new and surprisingly effective degassing compositions suitable for use in powder coatings. Curable compositions which utilize the new degassing compositions are also disclosed.

6 Claims, 1 Drawing Sheet

Mixtures of Amide Wax and Various Degassing Agents from Examples 3 through 7

OTHER PUBLICATIONS

Jung et al., New Latent amines for the coatings Industry, Basel Switzerland, Ciba, 1996/97 (See Table 1 at p. 1).

Benzoin Ethylene Ketal, Sigma Aldrich, Jan. 5, 2007 (Excerpt from on-line catalog appears to be an offer to sell.).

Lonza, Acrawax C, N, N' Ethylene Bisstearamide, CAS No. 110-30-5, Nov. 14, 2005 (Product specifications for Acrowax C.).

Velsicol, Benzoflex 352, Product Information Bulletin, Rosemont, IL.

Summerbell et a., Rearrangements of a-Halogenated Ethers. II The Preparaton and Some Reactions of 2,3-Diphenyl-p-dioxene, Jun. 16, 1958.

Maxwell et al., Tech Paper, Understanding the Mode of Action in Benzoin in Powder Coatings, Springfield, MA Jan. 31, 2007 (pp. 1 through 12.).

How benzoin works in powder coatings, COAT, vol. 9 Apr. 2003, The Netherlands (pp. 5-6).

Cameron et al, Photogeneration of amines from a-keto carbamaes design and prepareation of photoactive compounds, J. Chem Soc., Jan. 1997 (see p. 2430—Scheme 2; p. 2431—schemes 3 and 4; and p. 2433—scheme 7).

* cited by examiner

Figure 1

DEGASSING COMPOSITIONS FOR CURABLE COATINGS

BACKGROUND OF THE INVENTION

1. Field of the Invention

The present invention relates to compositions of matter which promote the escape of air, water, or other volatile materials from curable film-forming resins before or during the resin curing process. More specifically, the invention relates to degassing agents and degassing compositions for curable coating compositions.

2. Description of the Related Art

Coatings which are intended to cure in place and produce a relatively smooth or transparent surface are naturally susceptible to defects stemming from entrapped bubbles. Defects associated with entrapped bubbles are known in the coatings industry as pinholing, cratering, cracking, orange peel, and loss of gloss, for example, and sometimes indicate diminished chemical and physical properties in the affected portion of the coating. The coatings may be solvent-based coatings, water-based coatings or powder coatings, to name a few.

Bubble formation is typically related to a change in physical conditions such as heating or cooling, or a chemical reaction within the coating. Many traditional curing processes for coatings involve chemical reactions which routinely produce bubbles containing air, water, nitrogen, or volatiles such as evaporated solvent, among other things. If the material within the bubbles escapes before the coating hardens, any possible defect in the coating is minimized or avoided. Degassing agents have been developed over the years to promote the timely escape of material from the bubbles into or through the coating.

U.S. Pat. No. 3,872,040, issued to Mollohan et al., describes powder coating compositions formulated to contain a minor proportion of a natural or synthetic wax. The wax is said to promote films having smooth surfaces which are substantially free of voids or entrapped gas pockets.

U.S. Pat. No. 5,153,252, issued to Skora, describes a melt viscosity modifier which reportedly acts to permit the release of entrapped gases and volatiles from a thermosetting powder coating film and, thereby, prevent the formation of pin-holes. The Skora patent states that the melt viscosity modifier has the structure of bis-phenoxy propanol and is preferably 1,3-bis-phenoxy-2-propanol.

U.S. Pat. No. 5,342,893 issued to Wilkinson, et al., describes a thermosetting powder coating composition containing, as an anti-popping agent, a thermoplastic polymer which i) is solid, ii) has a Tg of 30° C., iii) comprises, at least mainly, units derived from at least one alkyl acrylate or alkacrylate and iv) has an acid value of no more than 10.

A European Patent Application published under number EP 0 471 409 reports a degassing agent for powder coatings which is a crystalline wax having a low surface tension, a melting point in the range of 100 to 160° C., and a viscosity measured 10° C. above the melting point of less than 50 mPas. The '409 application also describes the degassing agent as containing an amide bond and a fatty acid group, such as the distearyl amide of ethylene diamine.

U.S. Pat. No. 6,100,349, issued to Koenraadt et al., describes benzoin and cyclohexane dimethanol dibenzoate as degassing media suitable for use in a thermosetting powder coating composition. While benzoin is widely used in the coatings industry, it has been known to discolor white and light-colored coatings, and to cloud transparent and translucent coatings under some circumstances.

U.S. Pat. No. 6,184,279, issued to Anderson et al., describes compositions including the cured coatings of at least one curable film-forming resinous material along with an effective degassing amount of a material having the structure:

and dimer derivatives thereof wherein R and R' are the same or different and are primary alkyl groups with 1 to 6 carbon atoms including methyl or an aromatic group containing at least one heteroatom.

Volatile organic compounds (VOC) are suspected of depleting of the ozone layer, which shields humans from dangerously high levels of ultraviolet radiation (UVR). Significantly depletion of the ozone layer would likely result in higher incidence of skin cancer and related ailments. While VOC is known to emanate from a variety of sources, solvent based coatings and water based coatings are generally considered to be contributing to the problem.

The coatings industry is working on several fronts to lower VOC content in coatings. One major effort involves switching from organic solvent based coatings to water based coatings, which contain relatively less VOC. Also, efforts are being made to completely avoid solvents by formulating more and better powder coatings and UV curable coatings. Powder coatings are applied as solids at room temperature and, subsequently, cured by heating to a liquid form in which cross linking chemical reactions cure and harden the coating. While the coating is in liquid form, additives such as flow agents, leveling agents and degassing agents play important roles in keeping the coating smooth and bubble-free.

For many years, benzoin has been the additive of choice for the prevention of pinholes primarily due to its relatively high efficiency and low cost. Benzoin does, however, have drawbacks. One drawback is its tendency to impart yellowness to coatings, especially white or clear coatings. A second drawback is that benzoin sublimes at elevated temperature and tends to coat the bulbs of infra-red lamps which are commonly used for curing the coatings. A third drawback is that benzoin decomposes and discolors over time, particularly in the presence of ultra-violet radiation and at elevated temperature.

Much effort has been devoted to developing better degassing agents, and the accomplishments of previous researchers are numerous and impressive. However, a need still exists for an improved degassing agent which is affordable and effective, will not discolor white and light-colored coatings, and will not cloud transparent and translucent coatings.

SUMMARY OF THE INVENTION

It has now been discovered that certain compounds which include a plurality of unfused aromatic rings and at least one functional group selected from ketals, carbamates, carbonates and carboxylic acid esters are useful as degassing agents for curable coating compositions. The degassing agents of the present invention may be categorized structurally as the reaction products of benzoin with a diol, a polyol, an isocyanate, a haloformate, a dicarboxylic acid or an acid anhydride, among others. Alternatively, the degassing agents may be viewed as aromatic compounds having an alpha-hydroxy ketone functional group which is chemically bonded with a protective group. The degassing agents are relatively stable at resin curing conditions, and tend to resist decomposition and discoloration. The degassing agents may be synergistically combined with other materials, such as fatty acid amide-containing waxes, to produce new and surprisingly effective degassing compositions suitable for use in powder coatings.

In one aspect, the invention is a degassing composition comprising an amide wax and a degassing agent which is the reaction product of benzoin and a diol, a polyol, an isocyanate, a haloformate or a dicarboxylic acid anhydride. The amide wax preferably includes an alkanyl of about six to about twenty-two carbon atoms or an alkenyl of about six to about twenty-two carbon atoms. The amide wax has a melting point in the range of about 100 to about 180° C. The mass of the degassing agent and the mass of the amide wax are each about 0.1 percent to about 5 percent of the total mass of the degassing composition. Preferably, the mass fraction of the degassing agent is about 0.05 to less than about 1, based on the total mass of the degassing agent and the amide wax.

DETAILED DESCRIPTION OF PREFERRED EMBODIMENTS

Applicants have discovered that degassing is enhanced in curable coating compositions by the presence of a degassing agent, which includes a plurality of unfused aromatic rings and at least one functional group selected from ketals, carbamates, carbonates and carboxylic acid esters. The degassing agents of the present invention may be synergistically combined with known amide waxes to produce new and surprisingly effective degassing compositions.

In a preferred embodiment, the invention is a degassing composition including an amide wax and a degassing agent of Formula I, as set forth below:

Formula I

In the degassing agent of Formula I, each of R1, R2, R3, R4, and R5 is independently hydrogen or alkanyl of about one to about twenty carbon atoms, alkenyl of about one to about twenty carbon atoms or aryl of about one to about twenty carbon atoms. Preferably, the number of carbons atoms in the alkanyl, the alkenyl or the aryl is about one to about twelve, more preferably about one to about six. More preferably, R2 is alkanyl of about five to about eight carbon atoms R6 is independently hydrogen, alkanyl of about one to about eighteen carbon atoms, alkenyl of about one to about eighteen carbon atoms or aryl of about one to about eighteen carbon atoms. Preferably the number of carbons atoms in the alkanyl, the alkenyl or the aryl is about one to about eight, more preferably about one to about four. Preferably, n is an integer in the range of about 0 to about 16, more preferably in about 0 to about 6, most preferably about 1 to about 4.

"Alkyl" or "alkanyl" means a chemical structure which differs from that of a substituted or unsubstituted alkane by the absence of a hydrogen atom. "Alkenyl" means a chemical structure which differs from that of a substituted or unsubstituted alkene by the absence of a hydrogen atom. "Aryl" means a chemical structure which differs from that of a substituted or unsubstituted aromatic compound by the absence of a hydrogen atom. For the present purposes, "substituted or unsubstituted" means that include additional substituents may be present such as, for example, hydrogen, alkanyl of about one to about twenty carbon atoms, alkenyl of about one to about twenty carbon atoms, aryl of about one to about twenty carbon atoms, —CN, —NO2, —Cl, —Br, —F, —CF3, an oxo-group, a keto-group, or a carboxy-group.

"Degassing" means promoting the timely escape of material from bubbles in a curable coating material into or through the coating. Degassing agents promote this escape, although the mechanism by which the degassing agents perform this function is not well understood. The degassing agent of the present invention is generally utilized in an amount in the range of about 0.01 to 10.0 mass percent, preferably about 0.1 to about 3.0 mass percent, ideally about 0.5 mass percent of the curable coating composition.

It is contemplated that degassing compositions and powder coating pre-blends of the present invention may include two or more degassing agents or, a degassing agent and a compound which synergistically enhances the degassing activity of the degassing agent. The additional degassing agent and/or synergistic compound may be, for example, a natural or synthetic wax, as described in U.S. Pat. No. 3,872,040, issued to Mollohan et al., which is hereby incorporated in its entirety and specifically for its teachings regarding waxes for powder coatings.

Wax is the name applied originally to naturally occurring esters of fatty acids and certain alcohols, but now applied to both natural and manufactured products resembling these esters. For the present purposes, "wax" means a lubricant which is solid at room temperature. "Amide wax" means a lubricant which is solid at room temperature and includes an amide functional group.

The wax of the present invention is preferably a relatively long chain ester or polyester, a relatively long chain phosphate, or a relatively long chain amide. Preferred long chain esters are the reaction products of alcohols having about 6 to about 22 carbon atoms with carboxylic acids having about 6 to about 22 carbon atoms. Preferred long chain polyesters have about 6 to about 22 carbon atoms and are esters of glycerol, trimethylolpropane, ditrimethylolpropane, benzyl alcohol, or substituted aromatic alcohols. The wax preferably has a molecular mass of less than about 1000 daltons and a melting point in the range of about 100 to about 180° C., more preferably of about 130 to about 160° C.

Preferred amides for use as the wax are those having one or more alkyls, alkenyls or aryls, each including in the range of about 1 to about 32 carbon atoms, more preferably about 6 to about 22 carbon atoms. Especially preferred are diamides having alkyls or alkenyls of about 6 to about 22 carbons. For example, the diamides may be manufactured from diamines such as ethylenediamine, 1,3-propylenediamine, 1,4-butylenediamine, and 1,6-hexylenediamine and fatty acids such as stearic acid, myristic acid, lauric acid and palmitic acid.

The wax is generally utilized in the amount of about 0.01 to 5.0 mass percent, preferably about 0.5 to about 3.0 mass percent, ideally about 1.0 mass percent of the curable coating composition.

When amide wax is utilized in the curable coating composition, it is preferred that the mass fraction of the degassing agent is in the range of about 0.05 to less than about 1, more preferably about 0.1 to less than about 0.8, most preferably about 0.1 to about 0.5, and ideally about 0.25, based on the total mass of the degassing agent and the wax in the curable coating composition.

In another preferred embodiment, the invention is a degassing composition including an amide wax and a degassing agent of Formula II, as set forth below:

Formula II

In Formula II, each of R7, R8 and R9 is independently hydrogen, alkanyl of about one to about twenty carbon atoms, alkenyl of about one to about twenty carbon atoms or aryl of about one to about twenty carbon atoms. Preferably, the number of carbons atoms in the alkanyl, the alkenyl or the aryl is about one to about twelve, more preferably about one to about six.

R10 is independently hydrogen, alkanyl of about one to about eighteen carbon atoms, alkenyl of about one to about eighteen carbon atoms or aryl of about one to about eighteen carbon atoms. Preferably the number of carbons atoms in the alkanyl, the alkenyl or the aryl is about one to about eight, more preferably about one to about four.

Each of R7 is independently hydrogen, methyl, hydroxymethyl, ethyl, hydroxyethyl, propyl, hydroxypropyl, butyl, hydroxybutyl, pentyl, hydroxypentyl, hexyl, or hydroxyhexyl. More preferably, the degassing agent of Formula II is selected from the group consisting of (4-methyl 2-phenyl-1,3-dioxolan-2-yl) phenyl methanol; (4-hydroxymethyl 2-phenyl-1,3-dioxolan-2-yl) phenyl methanol; (4-ethyl 2-phenyl-1,3-dioxolan-2-yl) phenyl methanol; (4-hydroxyethyl 2-phenyl-1,3-dioxolan-2-yl) phenyl methanol; (4-propyl 2-phenyl-1,3-dioxolan-2-yl) phenyl methanol; (4-hydroxypropyl 2-phenyl-1,3-dioxolan-2-yl) phenyl methanol; (4-butyl 2-phenyl-1,3-dioxolan-2-yl) phenyl methanol; (4-hydroxybutyl 2-phenyl-1,3-dioxolan-2-yl) phenyl methanol; (4-pentyl 2-phenyl-1,3-dioxolan-2-yl) phenyl methanol; (4-hydroxypentyl 2-phenyl-1,3-dioxolan-2-yl) phenyl methanol; (4-hexyl 2-phenyl-1,3-dioxolan-2-yl) phenyl methanol; (4-hydroxyhexyl 2-phenyl-1,3-dioxolan-2-yl) phenyl methanol. Of these, (4-hydroxymethyl 2-phenyl-1,3-dioxolan-2-yl) phenyl methanol; (4-ethyl 2-phenyl-1,3-dioxolan-2-yl) phenyl methanol; and (4-butyl 2-phenyl-1,3-dioxolan-2-yl) phenyl methanol are especially preferred.

Inspection of Formula II indicates that the degassing agent has a molecular structure substantially similar to that of benzoin, except that a ketal carbon associated with a five-membered dioxolane ring is located at the position corresponding to the carbonyl carbon atom of benzoin. The degassing agent of Formula II can be produced by, for example, reacting benzoin with a substituted or unsubstututed diol having hydroxyl groups attached to adjacent carbon atoms. Applicants have found that the five-membered ring ketals of benzoin are sufficiently stable to withstand powder coating curing conditions without excessive degradation or discoloration. Surprisingly, the five-membered ring ketals of benzoin perform effectively as degassing agents.

In still another preferred embodiment, the invention is a degassing composition including an amide wax and a degassing agent of Formula III, as set forth below:

Formula III

Each of R11, R12 and R13 in Formula III is independently hydrogen, alkanyl of about one to about twenty carbon atoms, alkenyl of about one to about twenty carbon atoms or aryl of about one to about twenty carbon atoms. Preferably, the number of carbons atoms in the alkanyl, the alkenyl or the aryl is about one to about twelve, more preferably about one to about six.

R14 is independently hydrogen, alkanyl of about one to about eighteen carbon atoms, alkenyl of about one to about eighteen carbon atoms or aryl of about one to about eighteen carbon atoms. Preferably the number of carbons atoms in the alkanyl, the alkenyl or the aryl is about one to about eight, more preferably about one to about four.

More preferably, each of R11 is independently hydrogen, methyl, hydroxymethyl, ethyl, hydroxyethyl, propyl, hydroxypropyl, butyl, hydroxybutyl, pentyl, hydroxypentyl, hexyl, or hydroxyhexyl. Most preferably, the degassing agent of Formula III is (2-phenyl-1,3-dioxane-2-yl) phenyl methanol; (4-methyl 2-phenyl-1,3-dioxane-2-yl) phenyl methanol; (4-hydroxymethyl 2-phenyl-1,3-dioxane-2-yl) phenyl methanol; (4-ethyl 2-phenyl-1,3-dioxane-2-yl) phenyl methanol; (4-hydroxyethyl 2-phenyl-1,3-dioxane-2-yl) phenyl methanol; (4-propyl 2-phenyl-1,3-dioxane-2-yl) phenyl methanol; -(4-hydroxypropyl 2-phenyl-1,3-dioxane-2-yl) phenyl methanol; (4-butyl 2-phenyl-1,3-dioxane-2-yl) phenyl methanol; (4-hydroxybutyl 2-phenyl-1,3-dioxane-2-yl) phenyl methanol; (4-pentyl 2-phenyl-1,3-dioxane-2-yl) phenyl methanol; (4-hydroxypentyl 2-phenyl-1,3-dioxane-2-yl) phenyl methanol; (4-hexyl 2-phenyl-1,3-dioxane-2-yl) phenyl methanol; (4-hydroxyhexyl 2-phenyl-1,3-dioxane-2-yl) phenyl methanol. Especially preferred are (2-phenyl-1,3-dioxane-2-yl) phenyl methanol; (4-hydroxymethyl 2-phenyl-1,3-dioxane-2-yl) phenyl methanol; (4-ethyl 2-phenyl-1,3-dioxane-2-yl) phenyl methanol; and (4-butyl 2-phenyl-1,3-dioxane-2-yl) phenyl methanol.

Formula III indicates that the degassing agent has a molecular structure substantially similar to that of benzoin, except that a cyclic ketal carbon associated with a six-membered dioxane ring is located at the position corresponding to the carbonyl carbon atom of benzoin. The degassing agent of Formula III can be produced by, for example, reacting benzoin with a substituted or an unsubstututed diol having hydroxyl groups attached to alternate carbon atoms.

In still another preferred embodiment, the invention is a degassing composition including an amide wax and a degassing agent of Formula IV, as set forth below:

Formula IV

In Formula IV, R15 is independently hydrogen, alkanyl of about one to about ten carbon atoms, alkenyl of about one to about ten carbon atoms or aryl of about one to about ten carbon atoms. More preferably, the alkanyl, the alkenyl or the aryl includes about one to about six carbon atoms, most preferably about one to about four carbon atoms.

Each of R16 and R17 is independently hydrogen, alkanyl of about one to about twenty carbon atoms, alkenyl of about one to about twenty carbon atoms or aryl of about one to about twenty carbon atoms. More preferably, the alkanyl, alkenyl or aryl includes about one to about twelve carbon atoms, most preferably about one to about six carbon atoms.

R18 is independently hydrogen, alkanyl of about one to about eighteen carbon atoms, alkenyl of about one to about eighteen carbon atoms or aryl of about one to about twenty carbon atoms. More preferably, the alkanyl, alkenyl or aryl includes about one to about four carbon atoms, most preferably about one to about two carbon atoms. From inspection of Formula IV, it is apparent that the degassing agent has a molecular structure substantially similar to that of benzoin, except that an acyclic ketal carbon is located at the position corresponding to the carbonyl carbon atom of benzoin. The degassing agent of Formula III can be produced by, for example, reacting benzoin with one or a mixture of substituted and/or unsubstituted alcohols. The alcohols may be linear or branched.

It is highly recommended that the degassing agent and the amide wax be combined as components of a degassing composition before the degassing composition is introduced to the film-forming resin of the curable composition. Combining the degassing agent and the amide wax in this manner facilitates complete and uniform mixing, which is believed to enhance degassing performance. Preferably, the mass fraction of the degassing agent is in the range of about 0.05 to less than about 1, more preferably about 0.1 to less than about 0.8, most preferably about 0.1 to about 0.5, and ideally about 0.25, based on the total mass of the degassing agent and the amide wax in the degassing composition.

To produce the degassing composition, the degassing agent and the amide wax may be mixed in, for example, an axial mixer and subsequently co-extruded. Alternatively, the degassing agent and the amide wax may be combined in a molten state to produce the degasssing composition. It is also contemplated that in some instances emulsions or solutions will be prepared including the degassing agent and the amide wax, and that the emulsions or solutions will be added to the film-forming resin composition before any powder particles are formed.

In an additional preferred embodiment, the invention is a degassing composition including an amide wax and a degassing agent of Formula V, as set forth below:

Formula V

In Formula V, each of R19 and R20 is independently hydrogen, alkanyl of about one to about twenty carbon atoms, alkenyl of about one to about twenty carbon atoms or aryl of about one to about twenty carbon atoms. More preferably, the alkanyl, alkenyl or aryl includes about one to about twelve carbon atoms, most preferably about one to about six carbon atoms, and ideally about two carbon atoms. Z is alkylamino, carboxyalkyl alkoxyl.

Formula V shows that the degassing agent has a molecular structure substantially similar to that of benzoin, except that an amido group, carboxylate group or a carbonate group is located at the position corresponding to the hydroxyl hydrogen of benzoin. Applicants have found these derivatives of benzoin are sufficiently stable to withstand powder coating curing conditions without excessive degradation or discoloration. Surprisingly, these derivatives of benzoin perform effectively as degassing agents.

For example, replacing the hydrogen of benzoin or its analogs with an amido group produces the preferred degassing agents of Formula VI:

Formula VI

In Formula VI, wherein each of R17, R18, R19 and R20 is independently hydrogen, alkanyl of about one to about twenty-two carbon atoms, alkenyl of about one to about twenty-two carbon atoms or aryl of about one to about twenty-two carbon atoms. More preferably, R17 and R18 are each hydrogens or the alkanyl, the alkenyl or the aryl which includes about one to about twelve carbon atoms, most preferably about one to about six carbon atoms. More preferably, R19 and R20 are each hydrogens or the alkanyl, the alkenyl or the aryl which about twelve carbon to about twenty carbon atoms, most preferably about sixteen to about eighteen carbon atoms.

Additionally, replacing the hydroxyl hydrogen of benzoin or its analogs with a carboxylate group produces the preferred degassing agents of Formula VII:

Formula VII wherein each of R21, R22, and R23 is independently hydrogen, alkanyl of about one to about twenty carbon atoms, alkenyl of about one to about twenty carbon atoms or aryl of about one to about twenty carbon atoms. More preferably, the alkanyl, the alkenyl or the aryl includes about one to about twelve carbon atoms, most preferably about one to about six carbon atoms, and ideally about two carbon atoms.

Also, replacing the hydroxyl hydrogen of benzoin or its analogs with a carbonylcarboxylate group produces the preferred degassing agents of Formula VIII:

Formula VIII wherein each of R24 and R25 is independently hydrogen, alkanyl of about one to about twenty carbon atoms, alkenyl of about one to about twenty carbon atoms or aryl of about one to about twenty carbon atoms. More preferably, the alkanyl, the alkenyl or the aryl includes about one to about twelve carbon atoms, most preferably about one to about six carbon atoms, and ideally about two carbon atoms.

R26 is a divalent group which includes about 1 to about 20, more preferably about four to about twelve, carbon atoms and has a structure which differs from that of a substituted or an unsubstituted alkane, alkene, aromatic compound by the absence of two hydrogen atoms.

The curable coating composition of the present invention may include any of the curable film-forming resins known to those skilled in the art to be useful in curable coating compositions including solvent-based, water-based, and powder coatings. The water-based coatings include solutions, dispersions and emulsions in water or water and solvent blends.

One suitable class of polymer for the film-forming resins includes polymers derived from one or more ethylenically unsaturated monomers. Particularly useful members of this class are the acrylic polymers, such as polymers or copolymers of one or more alkyl esters of acrylic acid or methacrylic acid, optionally together with other ethylenically unsaturated monomers. Other suitable classes of polymers useful for the film-forming resin are polyepoxides, acrylosilane polymers, acrylic polyol polymers, and, polyisocyanates.

The curable coating compositions of the present invention are capable of film formation, at least after having participated in crosslinking reactions. In addition to the film-forming resinous material, the coating composition may have one or more crosslinking agents, which may be any known to those skilled in the art. Of course, the specific crosslinking agent used depends to some extent on the particular resinous material which is present, since the crosslinking agent and the resin interact. Suitable crosslinking agents include, for example, epoxidized Bisphenol A, dicarboxylic acids, glycidyl cyanurates, beta-hydroxy alkyl amides, dicyandiamide, phenolic crosslinkers and amine crosslinkers.

Alternatively, the film-forming resin for the water based coating composition may be an alkyd resin or a polyester. Such polymers may be prepared in a known manner by condensation of polyhydric alcohols and polycarboxylic acids. Where it is desired to produce air-drying alkyd resins, suitable drying oil fatty acids may be used such as those derived from linseed oil, soya bean oil, tall oil, dehydrated castor oil, or tung oil and the like.

Among the polyurethanes which may be used as the film-forming resin are polymeric polyols, which may be prepared by reacting the polyester polyols or acrylic polyols with a polyisocyanate. Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Cycloaliphatic diisocyanates may also be utilized, such as isophorone diisocyanate. The uretdiones of any of these are also suitable.

Where the film-forming resin is a liquid, the curable coating composition may include water or a solvent as a carrier. Where the film-forming resin is a particulate solid, the coating composition may be selected from any of the polymers known to those skilled in the art, including thermo-settable and UVR curable compositions. For example, the particulate resin for a powder coating may be an epoxy resin or a carboxylic functional polyester resin. The particulate film-forming resin material may alternatively be a thermoplastic particulate mixture of, for example, polyethylene, polypropylene, polyamide or polyester.

Additionally, for particulate or powder coating compositions, polymer or copolymer flow control or flow modifying agents known to those skilled in the art may be included in the curable coating composition. For example, commercially available flow control, leveling, adhesion and wetting additives may be used, such as additives under the registered trademark Powdermate which are available from Troy Chemical Corporation, Inc. of Florham Park, N.J.

The curable coating compositions of the invention may optionally include other materials such as pigments, fillers, catalysts such as organic peroxides and azo-type compounds, chain transfer agents, light stabilizers, flow control or modifying agents, additional film forming polymers, and antioxidants. One or more pigments may optionally be included in the curable coating composition.

Powder coating compositions of the present invention may be applied by spraying, and in the case of a metal substrate, by electrostatic spraying or by the use of a fluidized bed. The powder coating may be applied in a single sweep or in several passes to provide a film having a thickness after cure of from about 25 to about 400 microns. After application of the coating composition such as the preferred powder coating, the powder coating substrate is baked at a temperature sufficient to cure the coating, typically at about 120° C. to about 200° C. for about 1 to 60 minutes.

The following examples are presented to better communicate the invention, and are not intended to limit the invention in any way.

EXAMPLES

Example 1

Preparation of phenyl-(2-phenyl-1,3-dioxolan-2-yl) methanol

Benzoin is reacted with 1,2-ethanediol in the presence of an acid catalyst, water of reaction is removed by azeotropic distillation and the product is isolated. The melting point of the product is determined to be 143-146° C. The elemental analysis of the product is determined to be 75.98 wt % carbon and 6.29 wt % hydrogen. By way of comparison, phenyl-(2-phenyl-1,3-dioxolan-2yl)methanol contains 74.96 wt % carbon and 6.34 wt % hydrogen and is of formula:

Example 2

Preparation of phenyl-(4-hydroxymethyl-2-phenyl-1,3-dioxolan-2-yl) methanol

Benzoin is reacted with 1,2,3-propanetriol in the presence of an acid catalyst, water of reaction is removed by azeotropic distillation and the product is isolated. The melting point of the product is determined to be 150-152° C. The elemental analysis of the product is determined to be 71.31 wt % carbon and 6.34 wt % hydrogen. By way of comparison, phenyl-(4-hydroxymethyl-2-phenyl-1,3-dioxolan2yl)methanol contains 71.20 wt % carbon and 6.32 wt % hydrogen and is of formula:

Example 3

Preparation of phenyl-(4-ethyl-2-phenyl-1,3-dioxolan-2-yl) methanol

Benzoin is reacted with 1,2-butanediol in the presence of an acid catalyst, water of reaction is removed by azeotropic distillation and the product is isolated. The melting point of the product is determined to be 84-90° C. The elemental analysis of the product is determined to be 75.90 wt % carbon and 7.03 wt % hydrogen. By way of comparison, phenyl-(4-ethyl-2-phenyl-1,3-dioxolan-2-yl)methanol contains 76.03 wt % carbon and 7.09 wt % hydrogen and is of formula:

Example 4

Preparation of phenyl-(4-butyl-2-phenyl-1,3-dioxolan-2-yl) methanol

Benzoin is reacted with 1,2-hexanediol in the presence of an acid catalyst, water of reaction is removed by azeotropic distillation and the product is isolated. The melting point of the product is determined to be 128-130° C. The elemental analysis of the product is determined to be 76.90 wt % carbon and 7.80 wt % hydrogen. By way of comparison, phenyl-(4-butyl-2-phenyl-1,3-dioxolan-2-yl)methanol contains 76.89 wt % carbon and 7.74 wt % hydrogen and is of formula:

Example 5

Preparation of (2-oxo-1,2-diphenylethyl)-N-butyl-carbamate

Under a blanket of nitrogen, 63.3 g (0.3 mole) benzoin, 0.6 g 4-N,N-dimethylaminopyridine, 0.3 g dibutyltin dilaurate and 45 g (0.45 mole) n-butylisocyanate are charged into a 500 milliliter flask containing 200 milliliter 2-methyl-tetrahydrofuran. The flask is equipped with an agitator, a thermometer, a gas inlet tube, and a reflux condenser. The reaction mixture is heated to 85-90° C. and the progress of the reaction is monitored via Fourier Transform Infa-Red spectroscopy (FTIR) through detection of an —OH absorbance peak. When the reaction mixture is at temperature for 24 hours, the —OH absorbance peak is no longer detectable. Solvent is removed by rotary evaporation under vacuum at 50° C. and 22 mm Hg. vacuum. Acetone in the amount of 60 milliliter is added to the residue. The resulting solution is cooled in an ice bath. A filter cake of crystallized material is obtained by filtering the cool solution. The filter cake is washed with petroleum ether and is dried. Product in the amount of 45.2 g is recovered. Analysis of the product by High Pressure Liquid Chromatography (a HPLC) indicates (by area percent) a purity of 99%. The mother liquor is evaporated, is washed with petroleum ether and is dried to obtain an additional 36.62 g product. Overall yield is 88%.

The melting point of the product is determined to be 171-174° C. The elemental analysis of the product is determined to be 72.94 wt % carbon, 6.53 wt % hydrogen and 4.56 wt % nitrogen. By way of comparison, (2-oxo-1,2-diphenylethyl)-N-butyl-carbamate contains 73.29 wt % carbon, 6.80 wt % hydrogen and 4.50 wt % nitrogen and is of formula:

Example 6

Preparation of methyl (2-oxo-1,2-diphenylethyl)carbonate 106 g (0.5 mole) benzoin, 400 milliliter methylenechloride and 47.4 g (0.6 mole) pyridine is mixed in a one liter flask equipped with an agitator, a thermometer, and an addition funnel. The reaction mixture is cooled to 10-15° C. with an ice bath and 65.0 g (0.69 mole) methyl chloroformate is added dropwise over a period of 25 minutes while the temperature is maintained at 10-15° C. The temperature is increased to the boiling point and refluxing conditions are maintained for 5 hours. The reaction is monitored through an —OH absorbance peak by means of FTIR, which indicates about 3 percent unreacted benzoin at this time. The reaction mixture is continuously stirred for an additional 11-12 hours at room temperature. The reaction mixture is washed twice with water and washed once with a saturated salt solution. An organic phase of the reaction mixture is dried over MgSO4, is filtered and is evaporated using the rotary-evaporator. Petroleum ether is added to the residue and filtering of the ether and residue produces a solid, which is washed with petroleum ether and is dried. The mass of the product is determined to be 128.1 g (which is consistent with a yield of 95%) and HPLC analysis indicates that the product is 99.7% pure.

The melting point of the product is determined to be 92-94° C. The elemental analysis of the product is determined to be 70.86 wt % carbon and 4.92 wt % hydrogen. By way of comparison, methyl (2-oxo-1,2-diphenylethyl)carbonate contains 71.10 wt % carbon and 5.22 wt % hydrogen and is of formula:

Example 7

Preparation of 3-[(2-oxo-1,2-diphenylethoxy)carbonyl]propanoic acid 230 milliliter of cyclohexane, 63.3 g (0.3 mole) benzoin, 30.0 g (0.3 mole) succinic anhydride, and 0.4 g of 4-N,N-dimethylamino pyridine is charged in a 500 milliliter flask, which is equipped with a thermometer, a condenser, and an agitator. The reaction mixture is heated to boiling temperature (82-83° C.) and refluxed for 12 hours while the progress of the reaction is monitored by Thin Layer Chromatography (TLC). Solvent is removed from the reaction mixture by rotary evaporation under vacuum. Ethyl acetate is added to the residue and the resulting mixture is cooled. A precipitate forms in the cooled mixture. The precipitate is recovered by filtration, is washed with petroleum ether and is dried to produce 73.2 g product (which is consistent with 78% yield). A product purity of 98.8% is indicated by a HPLC.

The melting point of the product is determined to be 78-80° C. The elemental analysis of the product is determined to be 67.15 wt % carbon and 4.65 wt % hydrogen. By way of comparison, methyl (2-oxo-1,2-diphenylethyl)carbonate contains 69.22 wt % carbon and 5.16 wt % hydrogen and is of the formula:

Example 8

Relative Sublimation as Compared to Benzoin

The following procedure is used to demonstrate the amount of sublimation of a compound of interest at 140-145° C. An Aldrich sublimation apparatus (catalogue number Z221171EA), commercially obtainable from Sigma Aldrich of Milwaukee, Wis., U.S.A., is utilized in the procedure. A sample consisting of approximately 13 grams of a compound of interest is accurately weighed in a bottom vial portion of the apparatus, and this initial mass is recorded. The sample and the bottom vial portion are assembled with the rest of the apparatus. The apparatus is heated by means of an oil bath to 140-145° C. and is maintained at this temperature for one hour. The remaining sample and the bottom vial portion are accurately weighed to obtain the final mass. The final mass is subtracted from the initial mass to determine the amount of sublimation for the compound of interest at 140-145° C. The amount of sublimation for compound of interest is divided by the amount of sublimation for benzoin to provide sublimation as compared to benzoin.

The procedure is performed for each of the materials described above in Examples 1 to 7 and for benzoin, and relative sublimation as compared to benzoin for each of the materials is presented below in Table I.

TABLE I

| Compound of Interest | Relative Sublimation at 140-145° C. (as compared to Benzoin) |
| --- | --- |
| Benzoin (Prior Art) | 1.00 |
| Example 1 (Invention) | 0.63 |
| Example 2 (Invention) | 0.17 |
| Example 3 (Invention) | 0.12 |
| Example 4 (Invention) | 0.32 |
| Example 5 (Invention) | 0.05 |
| Example 6 (Invention) | 0.27 |
| Example 7 (Invention) | 0.86 |

The data in Table I indicates that compounds of the present invention sublime relatively less than benzoin. Among other reasons, less sublimation is desirable because sublimation of chemicals from a curable coating into the workplace is often associated with increased maintenance and disposal costs.

Example 9

Susceptibility to UVR Degradation

The following procedure is used to demonstrate the susceptibility of a compound of interest to ultra-violet radiation UVR degradation at 340 nanometers (nm). A test solution having acetonitrile as solvent and containing less than about one percent solution by mass of the compound of interest is prepared. The solution is analyzed initially by a HPLC. A 5 milliliter quartz quevette is filled with a sample of the solution and is exposed to 340 nm UV radiation for a period of four hours. The sample is analyzed at one hour, at two hours and at four hours by a HPLC to determine the amount of the compound of interest remaining in the solution. "UVR degradation" means one minus the amount of the compound of interest remaining in the solution divided by the amount of the compound of interest initially in the solution.

The procedure is performed employing benzoin and each of the materials described above in Examples 1 through 7 as the compound of interest. The results are presented below in Table II.

TABLE II

Susceptibility to UVR Degradation

| Compound of Interest | UVR Degradation at 340 nm (%) | | |
| --- | --- | --- | --- |
| | 1 Hour | 2 Hours | 4 Hours |
| Benzoin (Prior Art) | 30 | 47 | 75 |
| Example 1 (Invention) | 0 | 0 | 0 |
| Example 2 (Invention) | 0 | 0 | 5 |
| Example 3 (Invention) | 0 | 0 | 0 |
| Example 4 (Invention) | 0 | 0 | 0 |
| Example 5 (Invention) | 6 | 14 | 16 |
| Example 6 (Invention) | 32 | 44 | 64 |
| Example 7 (Invention) | 15 | 19 | 30 |

The data in Table II indicates that degassing agents of the present invention are relatively less susceptible to UVR degradation as compared to benzoin, which is desirable. UVR degradation is often associated with discoloration.

Because UVR degradation is known to be a form of free radical degradation, one might reasonably infer from the data in Table II that the compounds of the present invention are generally less susceptible to all forms of free radical degradation, including thermally-induced free radical degradation.

Example 10

Relative Bubble Reduction

The following procedure is performed to demonstrate the degassing efficiency of a compound of interest in a powder coating formulation. A carboxyl functional polyester resin commercially available from Bayer Material Science under the tradename RUCOTE® 560, a "Type 3" Bisphenol A epoxy resin commercially available from Shell Chemical under the tradename EPON® Resin 2002, a flow improver commercially available from Worlee AG under the tradename Resiflow PV88 and a degassing composition of interest are pre-blended in a Henschel mixer at a speed of 3600 revolutions per minute for a period of two minutes. Also, a blank comparison formulation having the same components except without any degassing composition is pre-blended under the same conditions. The compositions of the pre-blends are presented below in Table III.

TABLE III

Powder Coating Pre-blends

| Ingredients | Amount by Mass, g Blank Comparison (without degassing composition) | Amount by Mass, g Invention (contains degassing composition of interest) |
| --- | --- | --- |
| Rucote (R) 560 | 475.2 | 470.4 |
| Epon (R) Resin 2002 | 316.8 | 313.6 |
| Resiflow (R) PV88 | 8.0 | 8.0 |
| Degassing Compound of Interest | 0 | 8.0 |
| TOTAL (g) | 800.00 | 800.00 |

The pre-blend is extruded at 80° C. (zone 1) and 110° C. (zone 2) with a feed rate of 30% and a screw speed of 250 rpm. The extrudate is ground for ten to twelve seconds in a Strand grinder, and is sifted using a 200 T screen for twenty minutes. The sifted powder sample is sprayed with a Gema PG1 powder coating system onto a 3×"6" aluminum panel at a film thickness of 3.5 mils. The panel is baked for 10 minutes at 200° C. Bubbles in five separate 2×2 mm areas on the panel are counted and the total number of bubbles counted is multiplied by a factor of 5 to estimate the number average bubble density on the panel in bubbles per square centimeter. The difference obtained by subtracting the bubble density for the powder coating resulting from the pre-blend containing the degassing composition of interest from the bubble density for the powder coating resulting from the pre-blend containing no degassing agent, is divided by the bubble density for the powder coating resulting from the pre-blend containing no degassing agent, and multiplied by 100 to provide bubble reduction in percent.

The procedure is performed for the blank comparison pre-blend with no degassing composition, a pre-blend containing benzoin as the degassing composition of interest, and for pre-blends containing, respectively, each of the materials described above in Examples 2 through 7 as the degassing composition of interest. The results are presented below in Table IV.

TABLE IV

Bubble Reduction

| Degassing Compound of Interest in Pre-blend | Bubble Density on Panel (bubbles/cm) | Reduction of Bubbles (%) |
|---|---|---|
| None (Blank Comparison - Prior Art) | 940 | 0 |
| Benzoin (Prior Art) | 0 | 100 |
| Example 2 (Invention) | 0 | 100 |
| Example 3 (Invention) | 376 | 60 |
| Example 4 (Invention) | 25 | 97 |
| Example 5 (Invention) | 94 | 90 |
| Example 6 (Invention) | 244 | 74 |
| Example 7 (Invention) | 188 | 80 |

The data of Table IV indicates that the degassing agents of the present invention significantly reduce the number of bubbles in a powder coating of a pre-blend containing one of the degassing agents.

Example 11

Relative Yellowing of the Powder Coating

The following procedure is performed to demonstrate the relative yellowing of a powder coating of a pre-blend containing a degassing composition of interest. Each of the pre-blends described above containing, respectively, benzoin and the materials of Examples 2 through 7, is individually applied to black and white Metopac panels (T12G), from Leneta Corporation, at a film thickness of 2.5 mils. Two panels of each coating are baked at 200° C., one for 10 minutes (representing a normally baked coating) and one for 60 minutes (representing an over baked coating). CIE L*a*b* colorimetry values, which use b* as the criteria for yellowness, are measured from the white surface of each Leneta panel.

"Delta b" means the absolute value of the numerical difference in b* value of the panel of the blank pre-blend baked for 60 minutes and the panel of the pre-blend of the degassing composition of interest baked for 60 minutes. Delta b for each of the powder coatings is presented below in the right hand column of Table V. It is noteworthy that delta b of less than 2.0 is difficult to detect by the human eye. The data from Table IV above is reproduced in the other columns of Table V, in order to facilitate inspection.

TABLE V

Relative Yellowing of Powder Coatings at 200° C.

| Degassing Compound of Interest in Pre-blend | Bubble Density on Panel (bubbles/cm) | Reduction of Bubbles (%) | Delta b |
|---|---|---|---|
| Blank (Prior Art) | 940 | 0 | Not Applicable |
| Benzoin (Prior Art) | 0 | 100 | 3.94 |
| Example 2 (Invention) | 0 | 100 | 1.45 |
| Example 3 (Invention) | 376 | 60 | 1.1 |
| Example 4 (Invention) | 25 | 97 | 1.55 |
| Example 5 (Invention) | 94 | 90 | 1.80 |
| Example 6 (Invention) | 244 | 74 | 3.3 |
| Example 7 (Invention) | 188 | 80 | 1.7 |

The data in Table V indicates that the degassing composition of Example 2, which is composed of phenyl-(4-hydroxymethyl-2-phenyl-1,3-dioxolan-2-yl)methanol and is of the present invention, reduces bubbles as effectively as benzoin for the particular powder coating, and yellows significantly less as compared to benzoin in the particular powder coating. Additionally, several of the degassing compositions of the present invention are nearly as effective as benzoin in reducing bubbles, while yellowing significantly less than benzoin in the particular powder coating.

Example 12

Relative Bubble Reduction of Mixtures

The procedure described above in Example 10 is performed to demonstrate the degassing efficiency of various compounds of interest in a powder coating formulation. Each of the degassing compositions of interest is one of the materials described above in Examples 3 through 6, a commercially obtained amide wax which reportedly is composed essentially of N,N' ethylene bis (stearamide), or a mixture of one of the materials and the amide wax. N,N' ethylene bis (stearamide) has a CAS No. of 110-30-5 and a molecular mass of 593.03. The mixtures contain 25 percent, 50 percent or 75 percent by mass of one of the materials and the balance is the amide wax. In each case, the mass of the degassing composition of interest is 1.00 percent of the total mass of the pre-blend. The results are presented in FIG. 1.

Figure 1:
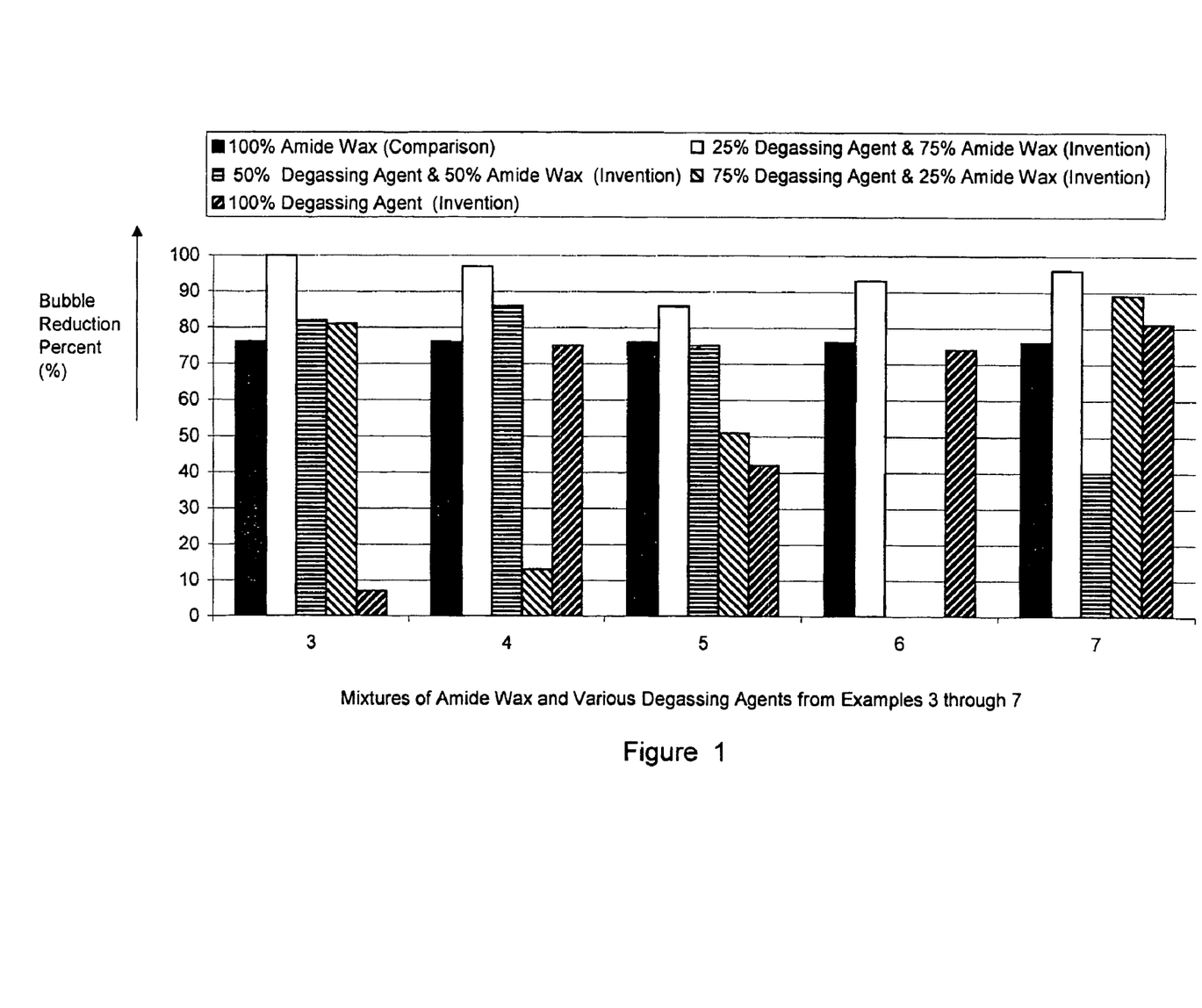
FIG. 1 is a bar chart which indicates that all of the degassing compositions which included degassing agents of the present invention provide significant bubble reduction in the powder coating.

Inspection of FIG. 1 indicates that all of the degassing compositions which include degassing agents of the present invention provide significant bubble reduction in the powder coating. However, the results for degassing compositions consisting entirely of a degassing agent of the present invention range from 7% to 81% bubble reduction. One explanation for this relatively wide range of range of results is that the degassing compositions consisting entirely of degassing agent may not be uniformly distributed throughout the pre-blends.

In contrast, the results for degassing compositions which include 25% of a degassing agent of the present invention and 75% of the amide wax are more consistent, ranging from 86% to 100% bubble reduction. The results for degassing compositions which include 50% or 75% of a degassing agent of the present invention and amide wax for the balance appear to be more consistent than the degassing compositions consisting entirely of a degassing agent of the present invention, and less consistent than the degassing compositions which include 25% a degassing agent of the present invention. Because the amide wax is employed commercially as a lubricant and flow improver, it is reasonable to conclude from these results that the presence of the amide wax facilitates mixing of the degassing composition in the pre-blend.

For comparison, the result for a degassing composition consisting entirely of the amide wax is also depicted in FIG. 1. Inspection of FIG. 1 indicates that the amide wax by itself provides 76% bubble reduction. This is less than the bubble reduction for all of the 25%/75% mixtures, and about equal to or less than the bubble reduction for all of the 50%/50% mixtures.

Example 13

Thermogravimetric Analysis (TGA)

The following procedure is performed to demonstrate the relative resistance of a compound of interest to thermal decomposition in air. The compound of interest, respectively benzoin and each of the degassing compositions pre-blends described above in Examples 2, 4, 5 and 6, is weighed initially and continuously while it is heated in air at a controlled rate. The progress of thermal decomposition is monitored via the mass. When the mass is 5% less than the initial mass, the temperature of the compound of interest is recorded. The results are presented below in Table VI.

TABLE VI

Thermogravimetric Analysis (TGA) Data

| Compound of Interest | Temperature at 5% Decrease in Mass (° C.) |
| --- | --- |
| Benzoin | 200 |
| Example 2 | 231 |
| Example 4 | 233 |
| Example 5 | 239 |
| Example 6 | 225 |

The data in Table VI indicates that, when heated alone in air, certain degassing compositions of the present invention are significantly less susceptible to thermal decomposition as compared to benzoin. Less thermal decomposition is desirable because, among other reasons, it is believed that degassing compositions which thermally decompose do not continue to perform the degassing function.

Overall, the degassing agents and degassing compositions of the present invention offer better stability against thermal and UVR degradation, less yellowing tendency in powder coating formulations, less sublimation and afford approximately the same degree of efficacy as previously known degassing agents.

The claimed invention is:

1. A degassing composition, which comprises:
   an amide wax; and
   a degassing agent of the formula:

wherein
   each of R7, R8 and R9 is independently hydrogen, alkanyl of about one to about twenty carbon atoms, alkenyl of about one to about twenty carbon atoms or aryl of about one to about twenty carbon atoms; and
   R10 is independently hydrogen, alkanyl of about one to about eighteen carbon atoms, alkenyl of about one to about eighteen carbon atoms or aryl of about one to about eighteen carbon atoms.

2. The degassing composition of claim 1 in which the amide wax is composed essentially of a diamide.

3. The composition of claim 1 in which:
   each of R7 is independently hydrogen, methyl, hydroxymethyl, ethyl, hydroxyethyl, propyl, hydroxypropyl, butyl, hydroxybutyl, pentyl, hydroxypentyl, hexyl, or hydroxyhexyl.

4. The composition of claim 1 in which the degassing agent is selected from the group consisting of (4-methyl 2-phenyl-1,3-dioxolan-2-yl)phenyl methanol; (4-hydroxymethyl 2-phenyl-1,3-dioxolan-2-yl)phenyl methanol; (4-ethyl 2-phenyl-1,3-dioxolan-2-yl)phenyl methanol; (4-hydroxyethyl 2-phenyl-1,3-dioxolan-2-yl)phenyl methanol; (4-propyl 2-phenyl-1,3-dioxolan-2-yl)phenyl methanol; (4-hydroxypropyl 2-phenyl-1,3-dioxolan-2-yl)phenyl methanol; (4-butyl 2-phenyl-1,3-dioxolan-2-yl)phenyl methanol; (4-hydroxybutyl 2-phenyl-1,3-dioxolan-2-yl)phenyl methanol; (4-pentyl 2-phenyl-1,3-dioxolan-2-yl)phenyl methanol; (4-hydroxypentyl 2-phenyl-1,3-dioxolan-2-yl)phenyl methanol; (4-hexyl 2-phenyl-1,3-dioxolan-2-yl)phenyl methanol; (4-hydroxyhexyl 2-phenyl-1,3-dioxolan-2-yl) phenyl methanol.

5. The composition of claim 4 in which the degassing agent is selected from the group consisting of (4-hydroxymethyl 2-phenyl-1,3-dioxolan-2-yl)phenyl methanol; (4-ethyl 2-phenyl-1,3-dioxolan-2-yl)phenyl methanol; and (4-butyl 2-phenyl-1,3-dioxolan-2-yl)phenyl methanol.

6. A degassing composition, which comprises:
   an amide wax, and
   (4-hydroxymethyl 2-phenyl-1,3-dioxolan-2-yl)phenyl methanol.

* * * * *